(12) United States Patent
Shaw, Jr. et al.

(10) Patent No.: US 10,883,893 B2
(45) Date of Patent: Jan. 5, 2021

(54) TESTING DEVICE AND SYSTEM FOR A BACKFLOW PREVENTER

(71) Applicant: LOW HANGING FRUIT, LLC, Phoenix, AZ (US)

(72) Inventors: Gary Lee Shaw, Jr., Scottsdale, AZ (US); Leland Colin Doyle, Scottsdale, AZ (US); Shannon Brook Downs, Scottsdale, AZ (US); Jeffrey John Downs, Scottsdale, AZ (US)

(73) Assignee: LOW HANGING FRUIT, LLC, Phoenix, AZ (US)

( * ) Notice: Subject to any disclaimer, the term of this patent is extended or adjusted under 35 U.S.C. 154(b) by 239 days.

(21) Appl. No.: 16/133,113

(22) Filed: Sep. 17, 2018

(65) Prior Publication Data
US 2019/0086289 A1 Mar. 21, 2019

Related U.S. Application Data

(60) Provisional application No. 62/559,461, filed on Sep. 15, 2017.

(51) Int. Cl.
*G01M 3/28* (2006.01)
*E03C 1/10* (2006.01)
*E03B 7/07* (2006.01)

(52) U.S. Cl.
CPC ........... *G01M 3/2876* (2013.01); *E03B 7/077* (2013.01); *E03C 1/106* (2013.01)

(58) Field of Classification Search
CPC ....... G01M 3/2876; E03B 7/077; E03C 1/106
USPC ......................................................... 73/1.72
See application file for complete search history.

(56) References Cited

U.S. PATENT DOCUMENTS

| | | | | |
|---|---|---|---|---|
| 5,257,208 A | * | 10/1993 | Brown | F16K 37/0091 340/626 |
| 5,566,704 A | * | 10/1996 | Ackroyd | E03B 7/077 137/14 |
| 5,713,240 A | * | 2/1998 | Engelmann | F16K 15/035 73/168 |
| 6,675,110 B2 † | | 1/2004 | Engelmann | |

(Continued)

*Primary Examiner* — Nathaniel T Woodward
(74) *Attorney, Agent, or Firm* — Weiss & Moy, P.C.; Jeffrey D. Moy

(57) ABSTRACT

A testing device for a backflow preventer assembly has a plurality of automated valves. Each automated valve is coupled to a corresponding test valve of the backflow preventer assembly. A high side diverter array is coupled to at least one of the plurality of automated valves. A low side diverter array is coupled to at least one of the plurality of automated valves. A vent side diverter array is coupled to at least one of the plurality of automated valves. A pressure differential transmitter is coupled to the high side diverter array and the low side diverter array. A high side bleed solenoid is coupled to a high side of the pressure differential transmitter. A low side bleed solenoid is coupled to a low side of the pressure differential transmitter. A vent side bleed solenoid coupled to a vent side diverter array. A plurality of bypass solenoids is coupled to the high side bleed solenoid, the low side bleed solenoid and the vent side bleed solenoid. A first sensor is coupled to the high side bleed solenoid, the low side bleed solenoid and the vent side bleed solenoid.

20 Claims, 10 Drawing Sheets

(56) References Cited

U.S. PATENT DOCUMENTS 9,476,805 B2 * 10/2016 Doran ................. G01M 99/008
2003/0135334 A1 * 7/2003 Engelmann ......... F16K 37/0091
                                                                      702/45

\* cited by examiner
† cited by third party

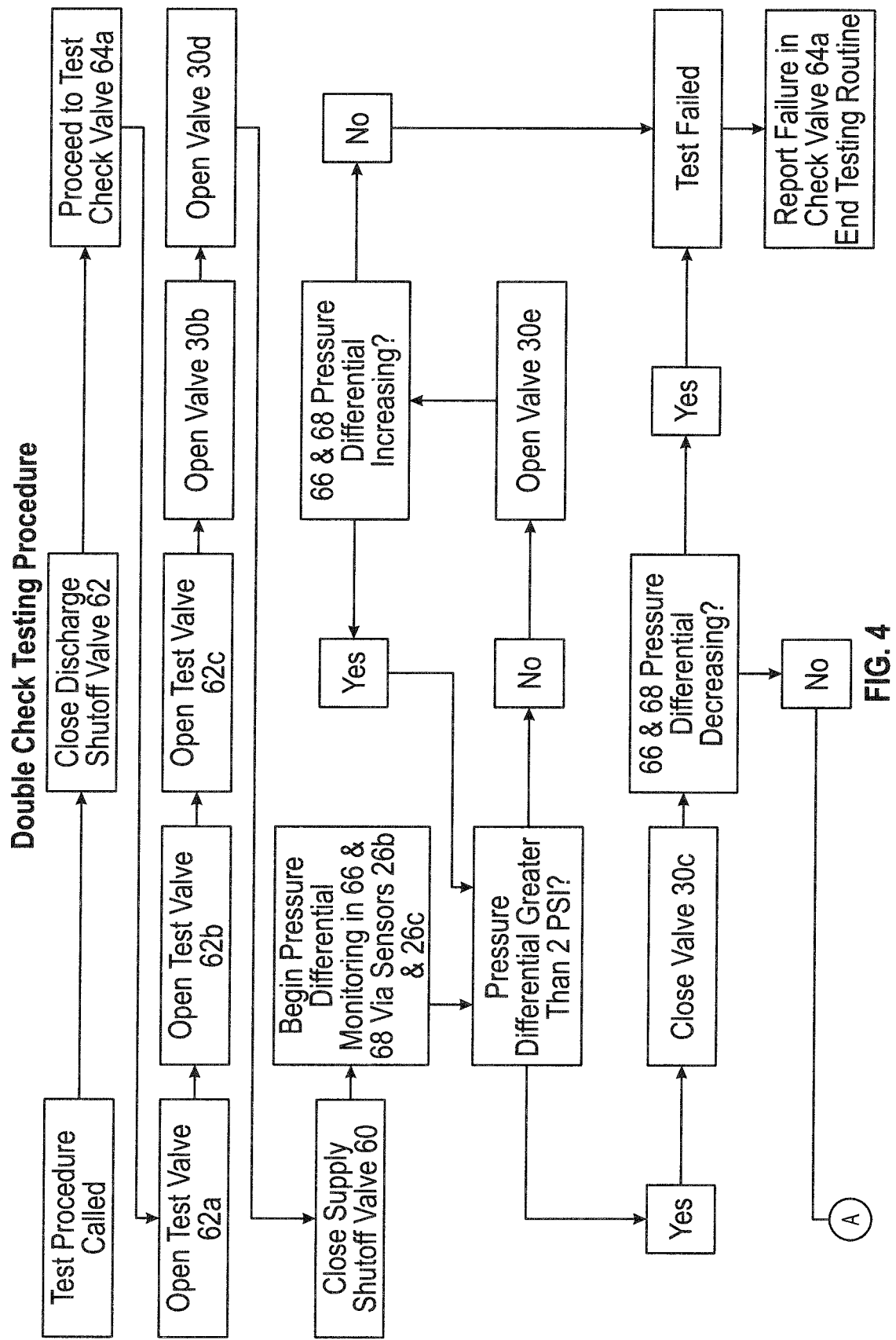

TESTING DEVICE AND SYSTEM FOR A BACKFLOW PREVENTER

RELATED APPLICATIONS

The present patent application claims the benefit U.S. Provisional Application No. 62/559,461, filed Sep. 15, 2017, entitled "TESTING DEVICE AND SYSTEM FOR BACKFLOW PREVENTOR" which IS incorporated herein by reference in its entirety.

FIELD OF THE INVENTION

The present invention relates generally to the field of municipal water supplies and, more particularly, to a testing device and system for a backflow preventer.

BACKGROUND OF THE INVENTION

Backflow, or the unwanted flow of water in the reverse direction, can cause contamination of a municipal water supply, which can lead to very serious health risks. Therefore, backflow preventers are pervasively used by municipalities to protect water supply lines and reservoirs from such contamination. Each backflow assembly is typically required to be certified prior to its installation and certified annually while it remains installed. It is the responsibility of the property owner to arrange for the certification tests to be completed. Certification tests must be performed by a certified technician and the cost of each test may range from $50 to over $200, depending upon the location and type of backflow assembly being tested.

There are some devices that have been described in the prior art which are used for automatic and reumote testing of backflow preventers. However those devices cannot replicate the proper tests performed by a service technician because they do not isolate the backflow preventer; i.e. they do not shut off water flow to the backflow preventer, and those devices only monitor the differential pressure between the two chambers in a backflow preventer (or upstream/downstream in a single check valve system). Furthermore, those devices are integrated devices and do not have the ability to be added to previously installed backflow preventers. Still further, those devices only use static pressure measurements to assume the check valves are in working order; i.e. they do not simulate siphon scenarios by creating downstream backpressure.

The present invention addresses this problem by providing a testing device and system for a backflow preventer that is capable of replicating the testing that must otherwise be performed by certified technicians and that is also capable of wirelessly reporting those results to any designated party, such as a municipal administrative body. The present invention is an active device that is also capable of passive monitoring of water usage. The present invention may also be used as a remote water shutoff.

SUMMARY

In accordance with one embodiment, a testing device for a backflow preventer assembly is disclosed. The testing device for a backflow preventer assembly has a plurality of automated valves. Each automated valve is coupled to a corresponding test valve of the backflow preventer assembly. A high side diverter array is coupled to at least one of the plurality of automated valves. A low side diverter array is coupled to at least one of the plurality of automated valves. A vent side diverter array is coupled to at least one of the plurality of automated valves. A pressure differential transmitter is coupled to the high side diverter array and the low side diverter array. A high side bleed solenoid is coupled to a high side of the pressure differential transmitter. A low side bleed solenoid is coupled to a low side of the pressure differential transmitter. A vent side bleed solenoid is coupled to a vent side diverter array. A plurality of bypass solenoids is coupled to the high side bleed solenoid, the low side bleed solenoid and the vent side bleed solenoid. A first sensor coupled to the high side bleed solenoid, the low side bleed solenoid and the vent side bleed solenoid.

In accordance with one embodiment, a testing device for a backflow preventer assembly is disclosed. The testing device for a backflow preventer assembly has a plurality of automated valves. Each automated valve is coupled to a corresponding test valve of the backflow preventer assembly. A high side diverter array is coupled to at least one of the plurality of automated valves. A low side diverter array is coupled to at least one of the plurality of automated valves. A vent side diverter array is coupled to at least one of the plurality of automated valves. A pressure differential transmitter is coupled to the high side diverter array and the low side diverter array. A high side bleed solenoid is coupled to a high side of the pressure differential transmitter. A low side bleed solenoid is coupled to a low side of the pressure differential transmitter. A vent side bleed solenoid is coupled to a vent side diverter array. A plurality of bypass solenoids is coupled to the high side bleed solenoid, the low side bleed solenoid and the vent side bleed solenoid. A first sensor coupled to the high side bleed solenoid, the low side bleed solenoid and the vent side bleed solenoid. A second sensor is coupled to the backflow preventer assembly. A controller controls operation of the testing device.

In accordance with one embodiment, a testing device for a backflow preventer assembly is disclosed. The testing device for a backflow preventer assembly has a first automated valve coupled to a first test valve of the backflow preventer assembly. A second automated valve is coupled to a second test valve of the backflow preventer assembly. A third automated valve is coupled to a third test valve of the backflow preventer assembly. A fourth automated valve is coupled to a fourth test valve of the backflow preventer assembly. A first high side diverter is coupled to the second automated valve. A second high side diverter is coupled to the third automated valve. A first low side diverter is coupled to the second automated valve. A second low side diverter is coupled to the third automated valve. A first vent side diverter is coupled to the first automated valve. A second vent side diverter is coupled to the fourth automated valve. A pressure differential transmitter is coupled to the first and second high side diverters and the first and second low side diverters. A high side pressure transmitter is coupled to a high side of the pressure differential transmitter. A high side bleed solenoid coupled to the high side of the pressure differential transmitter. A low side bleed solenoid is coupled to a low side of the pressure differential transmitter. A vent side bleed solenoid is coupled to a vent side diverter array. A first bypass solenoid is coupled to the high side of the pressure differential transmitter. A second bypass solenoid is coupled to the low side of the pressure differential transmitter. A third bypass solenoid coupled to the first bypass solenoid, the second bypass solenoid and the vent side bleed solenoid. A first sensor is coupled to the high side bleed solenoid, the low side bleed solenoid and the vent side bleed solenoid. A second sensor is coupled to the backflow preventer assembly. A controller controls operation of the testing device, the controller has a processor. A memory is coupled to the processor, the memory storing program instructions that when executed by the processor, causes the processor to: open the high side bleed solenoid, the low side bleed solenoid and the vent side bleed solenoid; monitor the pressure differential transmitter, the high side pressure transmitter and the bleed valves array sensor until all reads zero "0"; report if the bleed valves array sensor does not read zero "0"; open the first high side diverter and close the second high side diverter if bleed valves array sensor reads zero "0"; close the first low side diverter and open the second low side diverter; open the first vent side diverter valve and close the second vent side diverter valve; close a second shut-off valve of the backflow preventer; open the second test valve and the third test valve; bled air out through the high side bleed solenoid and the low side bleed solenoid until the bleed valves array sensor senses that the air is expelled; close the high side bleed solenoid and the low side bleed solenoid; open the first bypass solenoid and the third bypass solenoid until the bleed valves array sensor senses that all the air is expelled; close the first bypass solenoid and open the second bypass solenoid until the bleed valves array sensor senses that the air is expelled; close the second bypass solenoid and the third bypass solenoid; open the first bypass solenoid and the third bypass solenoid; open the fourth test valve; monitor the bleed valves array sensor until the air is expelled; close the vent side bleed solenoid; monitor the pressure differential transmitter until the pressure stabilizes; mark as "FAILED" if the pressure does not stabilize within a predetermined time frame; mark, as "PASSED" if the pressure stabilizes within the predetermined time frame; and close the fourth test valve.

BRIEF DESCRIPTION OF THE DRAWINGS

The novel features believed to be characteristic of the application are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The application itself, however, as well as a preferred mode of use, further objectives, and advantages thereof, will be best understood by reference to the following detailed description of illustrative embodiments when read in conjunction with the accompanying drawings, wherein:

DETAILED DESCRIPTION OF THE DRAWINGS

Figure 1:
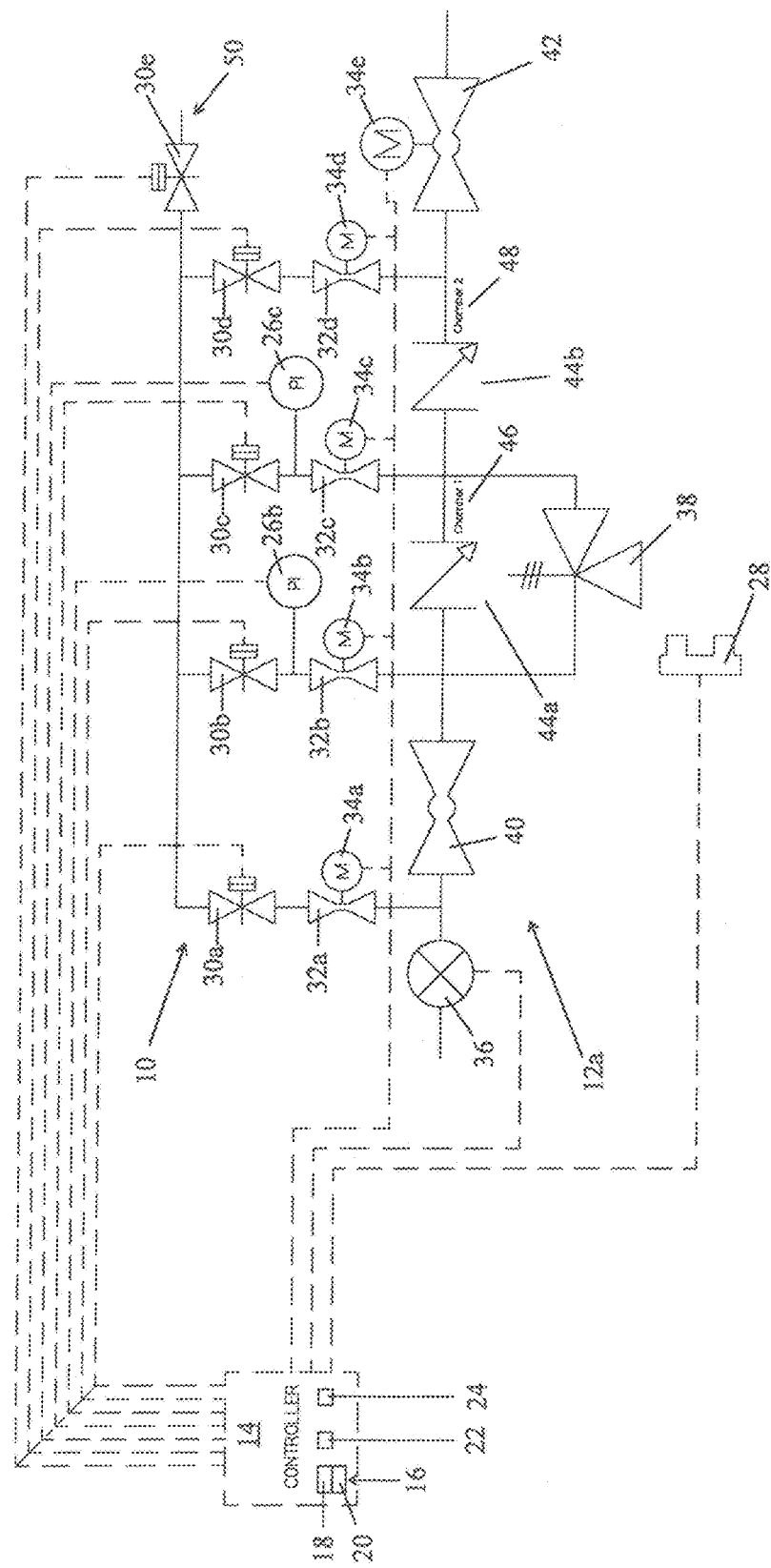
FIG. 1 is a diagram of a testing device for a backflow preventer, in accordance with one or more embodiments of the present invention, wherein the backflow preventer is a reduced pressure backflow preventer.

The description set forth below is intended as a description of presently preferred embodiments of the disclosure and is not intended to represent the only forms in which the present disclosure can be constructed and/or utilized. The description sets forth the functions and the sequence of steps for constructing and operating the disclosure. It is to be understood, however, that the same or equivalent fractions and sequences can be accomplished by different embodiments that are also intended to be encompassed within the spirit and scope of this disclosure.

FIGS. 1-5 together show a testing device 10 for a backflow preventer 12, the tests that it may perform, and a system network that it may be used in. The testing device 10 of the present invention may incorporate several modules: i.e. a controller assembly 14, a sensor array, solenoid valves 30, valve actuators 34, and a water metering system. Combining these modules allows the testing device 10 to perform the actions that a field technician would otherwise, perform during an annual certification test. The device 10 is installed on a backflow preventer 12 and remains there. This means that test results can be obtained multiple times a year, and continuous monitoring is made possible. A faulty backflow preventer 12 can be identified quickly, even in remote areas that would normally not be inspected by personnel. Water metering functionality allows the testing device 10 to detect usage patterns (in conjunction with software) and to warn of above-average water consumption.

Two-way communication is possible with radio technology, such as the LORA®, radio technology, which may be built into the testing device 10. LORA® technology is a type of long range, low power wireless platform that provides secure data transmission. This allows a user to trigger an action from the testing device 10, such as performing a test of the backflow preventer 12, and the testing device 10 may send an alert to a user indicating a leak or water consumption alarm.

The testing device 10 is designed to be modular, allowing it to be modified and installed on many models of backflow preventer assemblies 12. Two models of backflow preventers 12 that are commonly used are reduced pressure assemblies 12a (See FIG. 1), referred to generically as backflow preventer 12 and double check assemblies 12b (See FIG. 3), referred to genetically as backflow preventer 12. The controller assembly 14 can be connected to different types of backflow preventers 12 as well as different sizes of backflow preventers 12. The general configurations for the general types of backflow preventers 12 are discussed in detail below.

The testing device 10 of the present invention, in its simplest form, may comprise a controller assembly 14, one or more automated valves 30, one or more valve actuators 34, one or more pressure sensors 26, a water meter 36, and a flow sensor 28.

The controller assembly 14 may comprise a microcontroller 16, a power supply, and a radio 24. The microcontroller 16 is a system on a chip (SOC), which is an integrated circuit that integrates all components of the testing device 10. The microcontroller 16 may also have a memory 18 for storing programming instructions and information/data regarding the testing device 10 (e.g. location, model, owner, test results, etc.). The microcontroller 16 may have a processor 20 which is used to control the various functions of the testing device 10 and used to execute the programming instructions. The microcontroller 16 communicates with all of the peripherals of the testing device 10 through relays, or other circuits. Peripherals are the portions of the device 10 that are external to the controller assembly 14; e.g. a water meter 36 is an input peripheral and an automated valve 30 is an output peripheral. Depending upon the configuration of the backflow preventer 12 that the testing device 10 will be coupled to, different peripherals may be used in the testing device 12. The microcontroller 16 is therefore capable of running autonomously by performing tests on a predefined interval and is also capable of performing tests according to instructions sent to the microcontroller 16 from a remote location. The microcontroller 16 may have an initial base set of programming instructions when initially installed onto a backflow preventer 12, and the micro controller 16 may receive software updates or changes in programming instructions wirelessly from a remote location. The controller assembly 14 may also have various input and output ports for connections for peripherals. Weatherproof connectors may be used to connect the peripherals to the input and output ports of the microcontroller 16.

The radio 24 of the controller assembly 14 may use LORA® radio technology and may be capable of broadcasting on licensed or unlicensed spectrum frequency bands. The controller assembly 14 may be mounted in a weatherproof/waterproof enclosure with watertight connections for the peripherals. A USB cable, which is connected to the microcontroller 16, may also be included in the enclosure. The USB connection can be used for interfacing with the testing device 10 during installation or maintenance.

The automated valves 30 may be solenoid valves or any other appropriate valve type. These automated valves 30 open and close to interconnect the testing lines. It is preferable to use low voltage (e.g., 12V) so that the testing device 10 can be run on portable power supplies. The automated valves 30 may be a "fail closed" variety, ensuring that a loss of power will not result in a device failure or water leak. The automated valves 30 should be rated for the maximum operating pressure in the water line.

The valve actuators 34 may be servomechanisms (a/k/a servos), electric motors, pneumatic, etc. The valve actuators 34 actuate and are coupled to existing tea valves 32 in the backflow preventer 12. Without the use of the present testing device 10, these test valves 32 are typically opened manually with a screwdriver. It is preferable to use low voltage; however, the size of the test valve 32 will determine the necessary hardware to operate the mechanism. The valve actuators 34 may be mounted to each test valve 32 via a metal bracket cut to conform to the valve body of the test valve 32, allowing access to the valve stem of the test valve 32. The bracket prevents any movement of the valve actuator 34 relative to the valve body of the test valve 32, thereby ensuring accurate indexing of the valve stem position.

The sensor array may include pressure sensors 26 that measure the differential pressure in two lines. This can be either a single differential pressure sensor 26 or two pressure sensors 26 used in conjunction. The pressure sensors 26 are calibrated by the controller assembly 14 while in place on the backflow preventer 12 and can recalibrate at a set interval or if requested by the user. A typical backflow testing gauge (such as a Watts TK-99E) will show a differential pressure of 0 to 15 psi accurate to 0.15 psi (1% fill scale). The pressure sensors 26 installed on the testing device 10 will have a wide differential reading range and similar accuracy.

The sensor array may also include a flow sensor 28 that may be used to determine the functionality of the pressure relief valve 38 in certain models of backflow preventers 12. For example, the testing device 10 may use an ultrasonic sensor attached to the pressure relief valve 38 with a cage. The distance across the cage is measured as a baseline. When water flows through the pressure relief valve 38, it falls in front of the ultrasonic sensor which then measures a shorter distance indicating water flow. Other types of flow sensors 28 may be used, including mechanical flow sensors.

The water metering system may comprise a water meter 36 that may be used to monitor water consumption as well as to indicate if a test may proceed or not. Many backflow preventers 12 are installed with a water meter 36. This existing water meter 36 can be used or one can be installed onto a backflow preventer 12 that does not already have one. There are several types of water meters 36 than can be used. Many preinstalled water meters 36 will be positive displacement and compatible with a Hall Effect sensor for meter reading.

In one embodiment, as shown in FIG. 1, the testing device 10 may be used with a reduced pressure backflow preventer 12a, referred to generically as backflow preventer 12. As shown, the reduced pressure backflow preventer 12a has two integrated check valves 44a, 44b (each referred to generically as check valve 44); a pressure relief valve 38; two shutoff valves 40, 42; and four test valves 32a, 32b, 32c, 32d, each referred to generically as test valve 32. The testing device 10 has four automated valves 30a, 30b, 30c, 30d (each referred to generically as automated valve 30), wherein each of the four automated valves 30 is a solenoid valve that is connected to a corresponding test valve 32 on the reduced pressure backflow preventer 12b. An additional automated valve 30e (referred to generically as automated valve 30) may also be connected to allow for an atmospheric bleed line 50 to bleed water to the atmosphere. Two pressure sensors 26 may be used; one pressure sensor 26b (referred to generically as pressure sensor 26) placed between the test valve 32b of Chamber One 46 and its corresponding automated valve 30b and another pressure sensor 26c (referred to generically as pressure sensor 26) placed between the test valve 32c of Chamber Two 48 and its corresponding automated valves 30c. Valve actuators 34a, 34b, 34c, 34d, 34e (e.g. servomechanisms or servos), each referred to generically herein as valve actuator 34, may be connected to all of the test valves 32 and to the downstream shutoff valve 42. A flow sensor 28 may also be attached to the pressure relief valve 38. A water meter 36 is typically installed upstream of the reduced pressure backflow preventer 12a; however, if one is not already present on the reduced pressure backflow preventer 12a, one may be installed downstream.

Figure 2:
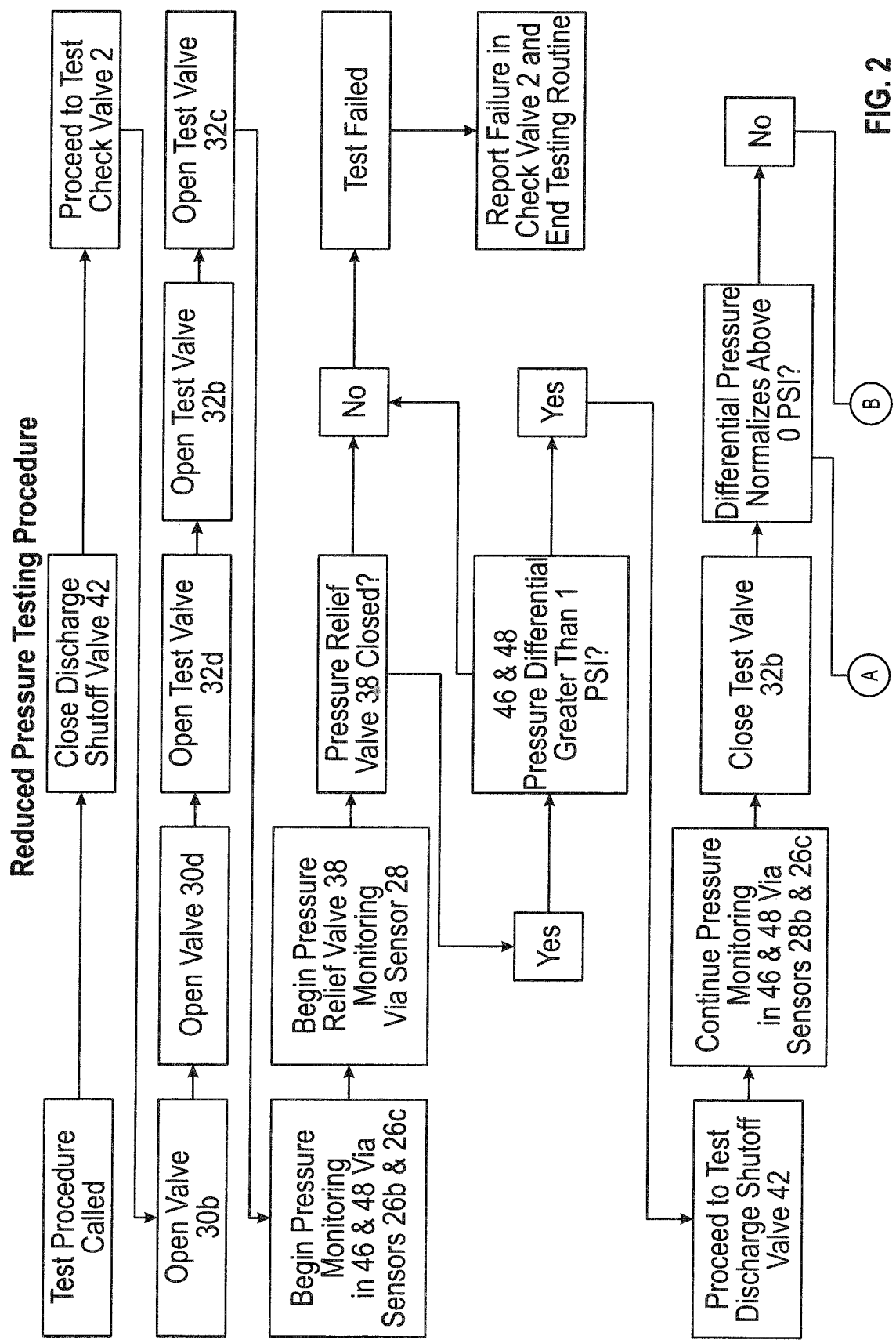
FIG. 2 is a flow chart diagram of the testing procedures that may be performed by the testing device of FIG. 1 on a reduced pressure backflow preventer.
Figure 2:
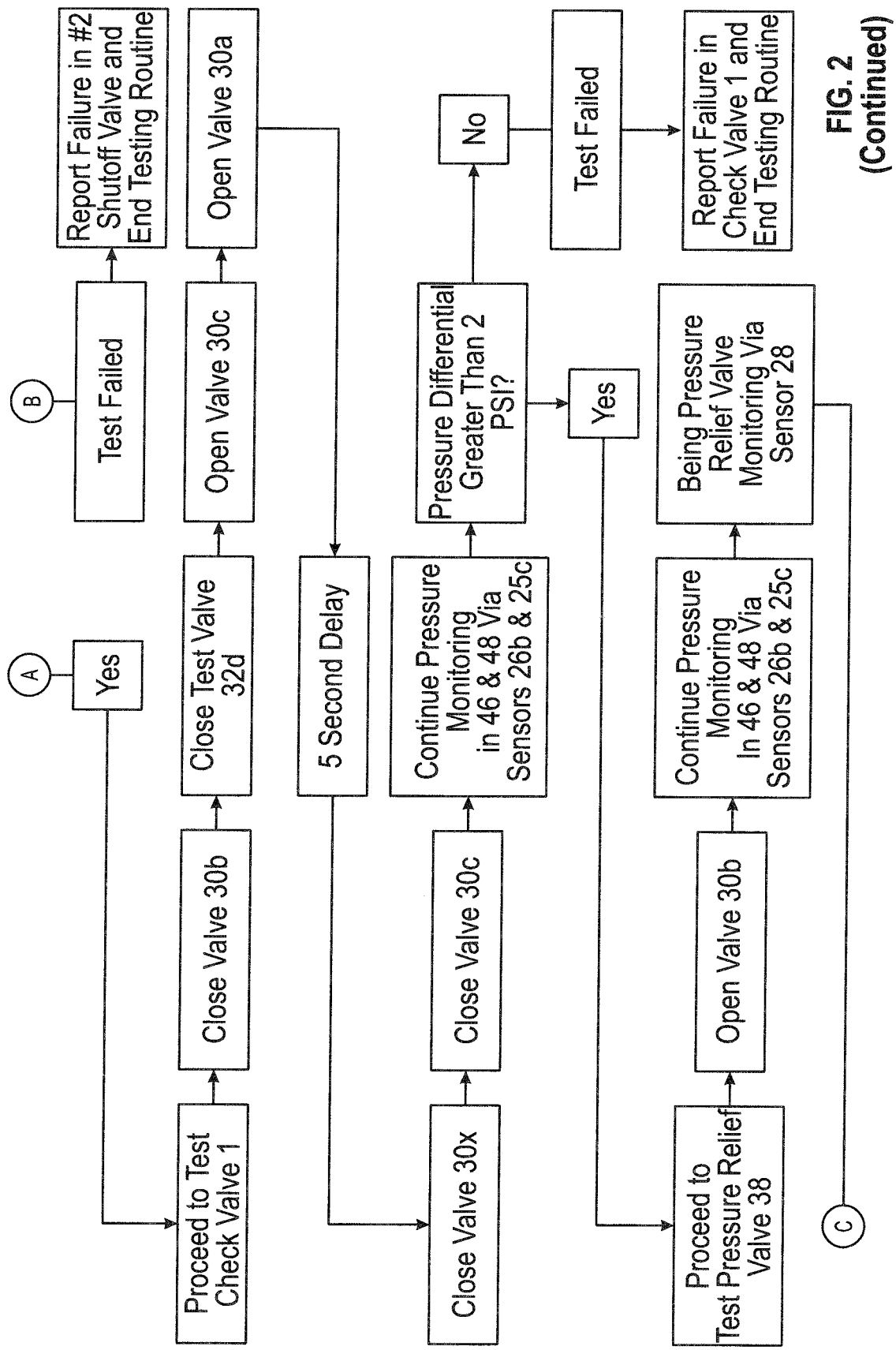
Figure 2:
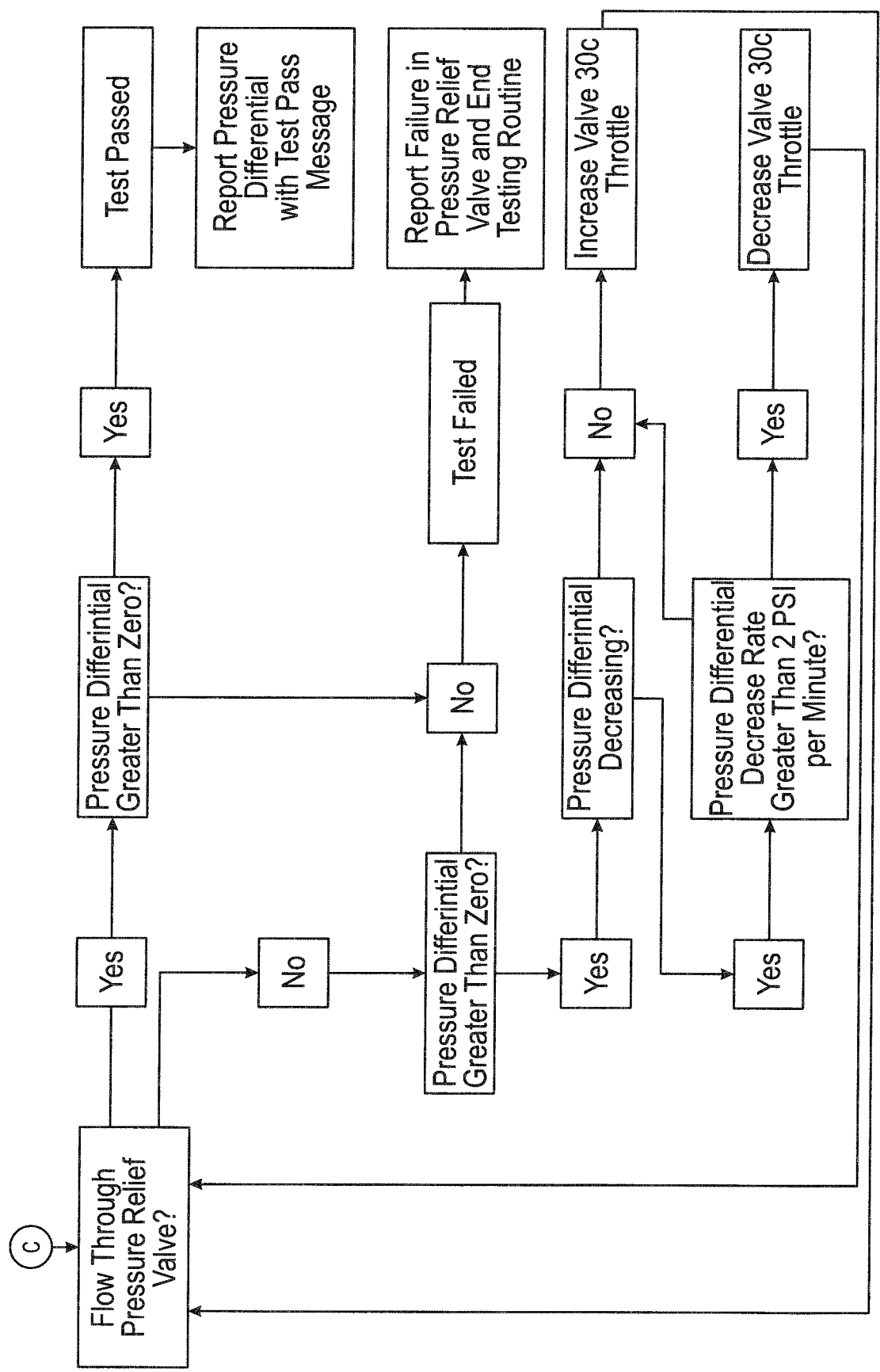

Referring to FIG. 2, four tests are typically required to certify a reduced pressure backflow preventer 12a; a test on Check Valve Two 44b; a test on Check Valve One 44a; a test on discharge shutoff valve 42; and a pressure relief valve 38 test. In order to set up the tests, the reduced pressure backflow preventer 12a is set up for normal operation; i.e. supply shutoff valve 40 and discharge shutoff valve 42 are open, test valves 32a, 32b, 32c, 32d are closed, and automated valves 30a, 30b, 30c, 30d are closed.

Test on Check Valve Two

The purpose of the test on Check Valve Two 44b is for tightness against reverse flow. In order to pass the test, Check Valve Two 44b must be tight against reverse flow under all pressure differentials. Initially, automated valves 30b and 30d are opened. Then test valve 32d is opened via actuator 34d, test valve 32b is them opened via actuator 34b, and test valve 32c is then opened via actuator 34c. The pressure differential in Chamber One 46 and Chamber Two 48 are continually monitored by pressure sensors 26b and 26c. And relief valve 38 condition is continually monitored by flow sensor 28. If the pressure differential drops below 1 psi OR relief valve 38 opens, test fails and the testing device 10 reports a failure. If pressure differential holds above 1 psi AND relief valve 38 remains closed, test passes and the testing device 10 moves to the next test.

Test on Discharge Shutoff Valve

The purpose of the test on discharge shutoff valve 42 is for tightness. Initially, test valve 32b is closed, via actuator 34b. Then, the differential pressure in Chamber One 46 and Chamber Two 48 is continually monitored with pressure sensors 26b and 26c, respectively. If pressure differential drops and approaches zero, the discharge shutoff valve 42 is leaking and the test fails. The testing device 10 reports a failed test. If the pressure differential holds, the test passes and the testing device 10 continues to the next test.

Test on Check Valve One

The purpose of the test on Check Valve One 44a is for tightness. In order to pass the test, Check Valve One 44a must be tight against reverse flow under all pressure differentials. Initially, automated valve 30b is closed and test valve 32b is opened via servo 34b. Then, test valve 32d is closed via servo 34d, automated valves 30c and 30e are opened to bleed water to atmosphere through the bleed line 50, and automated valves 30c and 30e are subsequently closed. The differential pressure in Chamber One 46 and Chamber Two 48 is continually monitored with pressure sensors 26b and 26c, respectively. If the differential pressure drops below 2 psi, the test fails, and the testing device 10 reports a valve failure. If the differential remains above 2 psi. The test passes and the testing device 10 continues to the next test.

Test on Pressure Relief Valve

The purpose of the test on the pressure relief valve 38 is to test the operation of the pressure relief valve 38. In order to pass the test, the pressure relief valve 38 must operate to maintain a differential of at least 2 psi between the supply and discharge of the reduced pressure backflow preventer 12a. Initially, automated valve 30b is open and the user would begin monitoring differential pressure. Then, automated valve 30e would be opened, while throttling to maintain a slow decrease in differential pressure. The flow sensor 28 will be monitoring the pressure relief valve 38 for operation. As the differential pressure drops, the pressure relief valve 38 will open. When flow is detected from the pressure relief valve 38, the differential pressure is recorded. If the relief valve 38 does not open, the test is reported as failed. If the pressure relief valve 38 opens, then the opening pressure is reported and the reduced pressure backflow preventer 12a is reported as passing.

After testing, the testing device 10 will be placed in "Standby" mode wherein all automated valves 30a, 30b, 30c, 30d, 30e are closed, all test valves 32a, 32b, 32c, 32d are closed, and the discharge shutoff valve 42 is open. The testing device 10 will continue to monitor the reduced pressure backflow preventer 12a periodically by powering on the flow sensor 28 to check for pressure relief valve 38 failure, and send updated water meter 36 readings.

Figure 3:
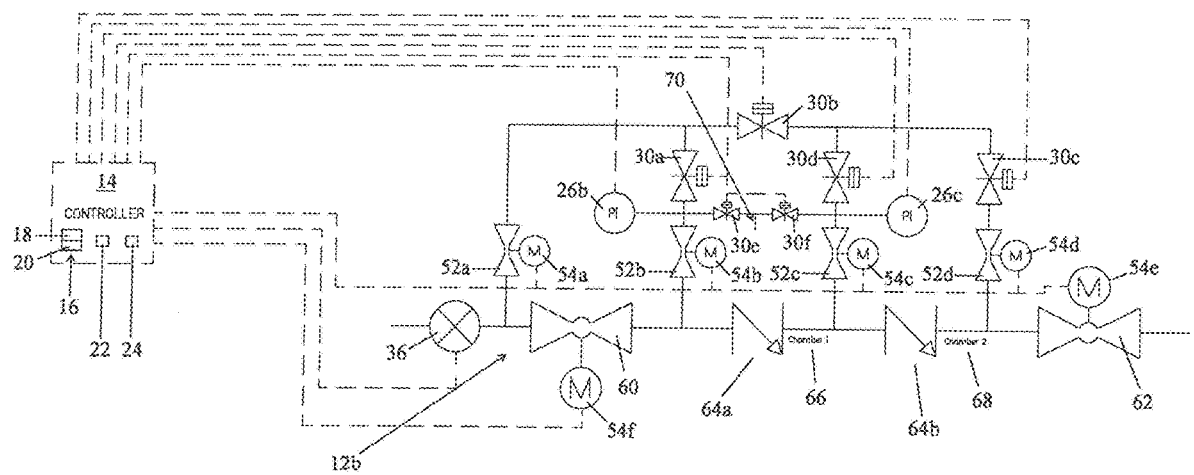
FIG. 3 is a diagram of the testing device of FIG. 1, wherein the backflow preventer is a double check backflow preventer.

In another embodiment, as shown in FIG. 3, the testing device 10 may be used with a double check backflow preventer 12b, referred to generically as backflow preventer 12. Here, the double check backflow preventer 12b is shown as having four test valves 52a, 52b, 52c, 52d, each referred to generically as test valve 52; two integrated check valves 64a, 64b, each referred to generically as check valve 64; and two shutoff valves 60, 62. Valve actuators 54a, 54b, 54c, 54d, 54e, 54f, each referred to genetically as valve actuator 54, are attached to the supply shutoff valve 60, the discharge shutoff valve 62 and the four test valves 52a, 52b, 52c, 52d.

A network of automated valves 30 is connected to the test valves 52a, 52b, 52c, 52d to create connections to the various testing points that the pressure sensors 26b, 26e must connect to. Six automated valves 30a, 30b, 30c, 30d, 30e, 30f, each referred to generically as automated valve 30, create all necessary connections. Pressure sensors 26b, 26c, each referred to generically as pressure sensor 26, are connected as shown. A water meter 36 is typically installed upstream of the double check backflow preventer 12b; however, if one is not already present on the double check backflow preventer 12b, one may be installed downstream.

Figure 4:
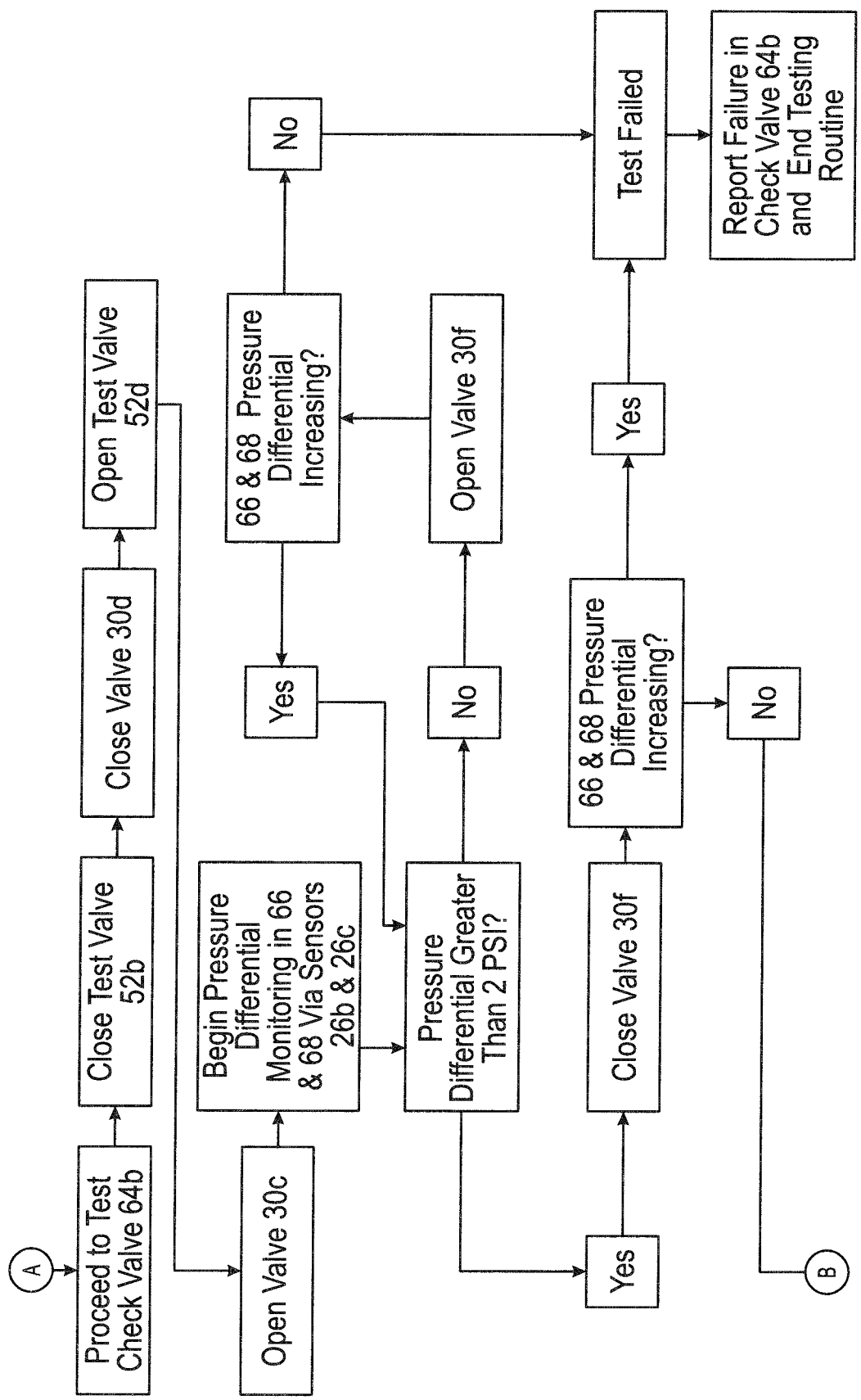
FIG. 4 is a flow chart diagram of the testing procedures that may be performed by the testing device of FIG. 3 on a double check backflow preventer.
Figure 4:
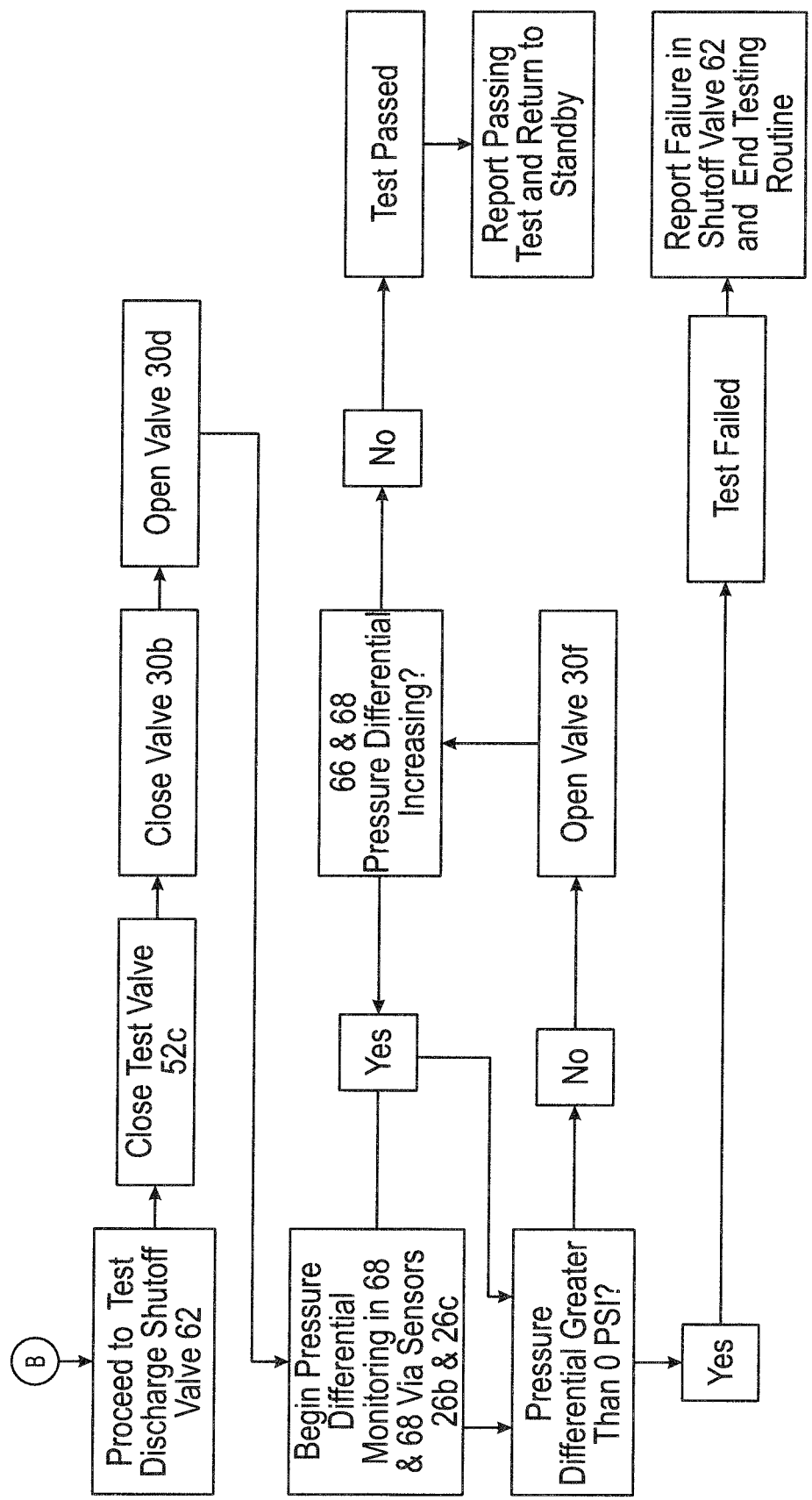

Referring to FIG. 4, three tests are typically required to certify a double check backflow preventer 12b; a test on Check Valve One 64a; a test on Check Valve Two 64b; and a test on the discharge shutoff valve 62. In order to set up the tests, the double check backflow preventer 12b is set up for normal service: all automated valves 30a, 30b, 30c, 30d, 30e, 30f are closed, all test valves 52a, 52b, 52c, 52d are closed, and the supply shutoff valve 60 and discharge shutoff valves 62 are open.

Test on Check Valve One

The purpose of the test on Check Valve One 64a is for tightness. Initially, the discharge shutoff valve 62 is closed via the attached actuator 54e. Test valves 52a, 52b, and 52c are then opened, automated valves 30b and 30d are also opened, and the supply shutoff valve 60 is closed via the attached actuator 54f. Bleed valve 30e is then opened to bleed water to atmosphere through bleed line 70 and to create a 2 psi differential reading recorded using pressure sensors 26b and 26e. Once differential pressure, reaches 2 psi, the bleed valve 30e is closed. If the differential pressure does not decrease, then Check Valve One 64a passes and the testing device 10 continues to the next test. If the differential pressure decreases, then the test fails and the testing device 10 reports a failure.

Test on Check Valve 2

The purpose of the test on Check Valve Two 64b is for tightness. Initially, test valve 52b is closed, then automated valve 30d is closed, and test valve 52d and automated valve 30c are opened. Bleed valve 30f is then opened to bleed water to atmosphere through bleed line 70 until differential pressure reaches 2 psi. Once differential pressure reaches 2 psi, the bleed valve 30f is closed. If the differential pressure does not decrease, then Check Valve Two 64b passes and the testing device 10 continues to the next test. If the differential pressure decreases, then the test fails and the testing device 10 reports a failure.

Test on Discharge Shutoff Valve

The purpose of the test on the discharge shutoff valve 62 is conducted by initially closing test valve 52c and automated valve 30b. Automated valve 30d is then opened. Automated valve 30b is then throttled and a user will monitor the differential pressure. If the differential pressure rises above 0, this means that the discharge shutoff valve 62 is leaking.

After testing, the testing device 10 will be placed in "Standby" mode wherein, all test valves 52a, 52b, 52c, 52d are closed, all automated valves 30a, 30b, 30c, 30d, 30e, 30f are closed, and shutoff valves 60, 62 are open.

Although the aforementioned tests are described, it should be clearly understood that other tests may be conducted and that the configuration of the testing device 10 may be modified accordingly to conduct those tests.

Figure 5:
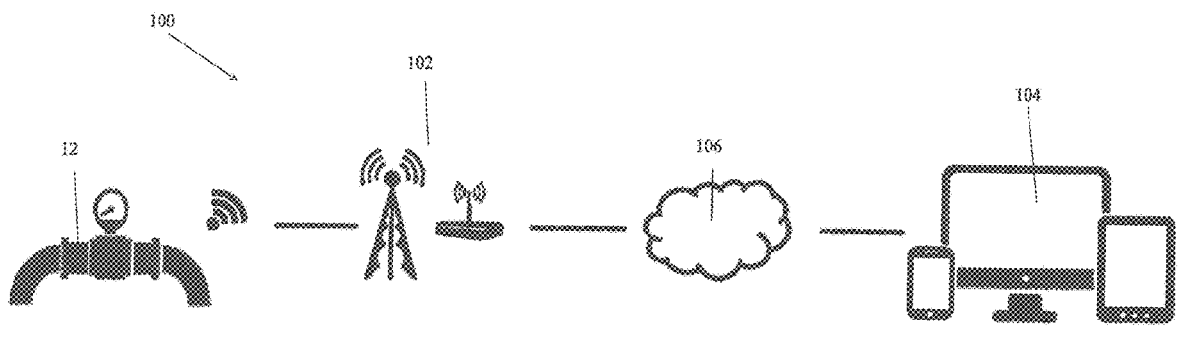
FIG. 5 is a diagram showing a system network for a plurality of the testing devices.

Referring to FIG. 5, the testing device 10 disclosed herein may be a part of a backflow preventer testing system 100. The testing system 100 may comprise a plurality of end points (e.g. the testing devices 10), a plurality of gateways 102 (e.g. Wireless Network Access Points), and a plurality of remote access points 104 (e.g. a user's computer or smart device such as a smartphone, a computing tablet, a personal computer, or any other electronic computing device capable of transmitting and receiving data via service provided by a cellular phone carrier or internet service provider), all of which are connected via a network to a network server 106. The network may be connected by wired or wireless means which, may include, but are not limited to, cellular, satellite, local area network (LAN), wide area network (WAN), low power wide area networks (LPWAN), Virtual Private Networks (VPN), or global network (e.g. Internet). The network 30 may also include Bluetooth wireless technology when using a smartdevice to communicate locally with a testing device 10 or other device/entity in the system 100.

The end points of the testing system 100 may comprise a plurality of testing devices 10. The testing devices 10 may communicate wirelessly with the system 100, both transmitting and receiving data via the radio 24 of each testing device 10. For example, the data that the testing device 10 may transmit may include: water meter data; relief valve opening alarms (i.e. if the backflow preventer 12 is so equipped); location of the testing device 10, which is either programmed upon installation of the testing device 10 or via Global Fashioning System; and backflow test results, where PASS tests will include pressure readings taken by the testing device 10 and FAIL tests will include the point of failure (e.g. Check Valve Two 44*b*, 64*b*). As another example, the data that the testing device 10 may receive may include: commands, such as RUN TEST commands or WATER SHUTOFF commands; usage requests; and firmware or software updates.

The gateways 102 of the testing system 100 may comprise a plurality of Wireless Network Access Points. Depending on the chosen method, this may be a LORA® radio technology access point, Wi-Fi router; BLUETOOTH® wireless technology receiver, Global System for Mobile Communications (GSM) or General Packet Radio Service (GPRS) antenna, or any other suitable and available network type. Either licensed or unlicensed communications methods may be used. The gateway 102 communicates with the testing devices 10 and transfers data to and from the network server 106 or Internet Protocol (IP).

The network server 106 may be a cloud server that communicates with the gateway 102 and manages the network. Data transmitted from the testing devices 10 is stored on this network server 106 and is accessible by remote access points 104.

The remote access points 104 may be the computers or electronic devices of users/customers; e.g. cell phones, tablets, etc. The information that a user will find valuable is stored on the network server 106. In order to access it, the user's remote access point 104 (i.e. computer or other device) will connect to the network server 106 using Application Programming Interfaces (APIs) provided by the network administrators. The remote access point 104 can then control the testing devices 10. The type of data that a user may access may depend on the type of backflow preventer 12 that the testing device 10 is installed on and if the customer is using a water meter 36 in conjunction with the testing device 10. If no water meter 36 is installed on the backflow preventer 12, the data will simply be test PASS/FAIL results at either predetermined testing intervals or after a test is requested by the user. If a water meter 36 is in use on the backflow preventer 12, the software can be designed to show usage patterns similar to the detailed view one would receive from utility companies on an electric bill or water bill. Based on the usage patterns, a threshold can be set and it can be determined whether there are irregularities which may indicate a leaking fixture, broken pipe, etc.

Figure 6:
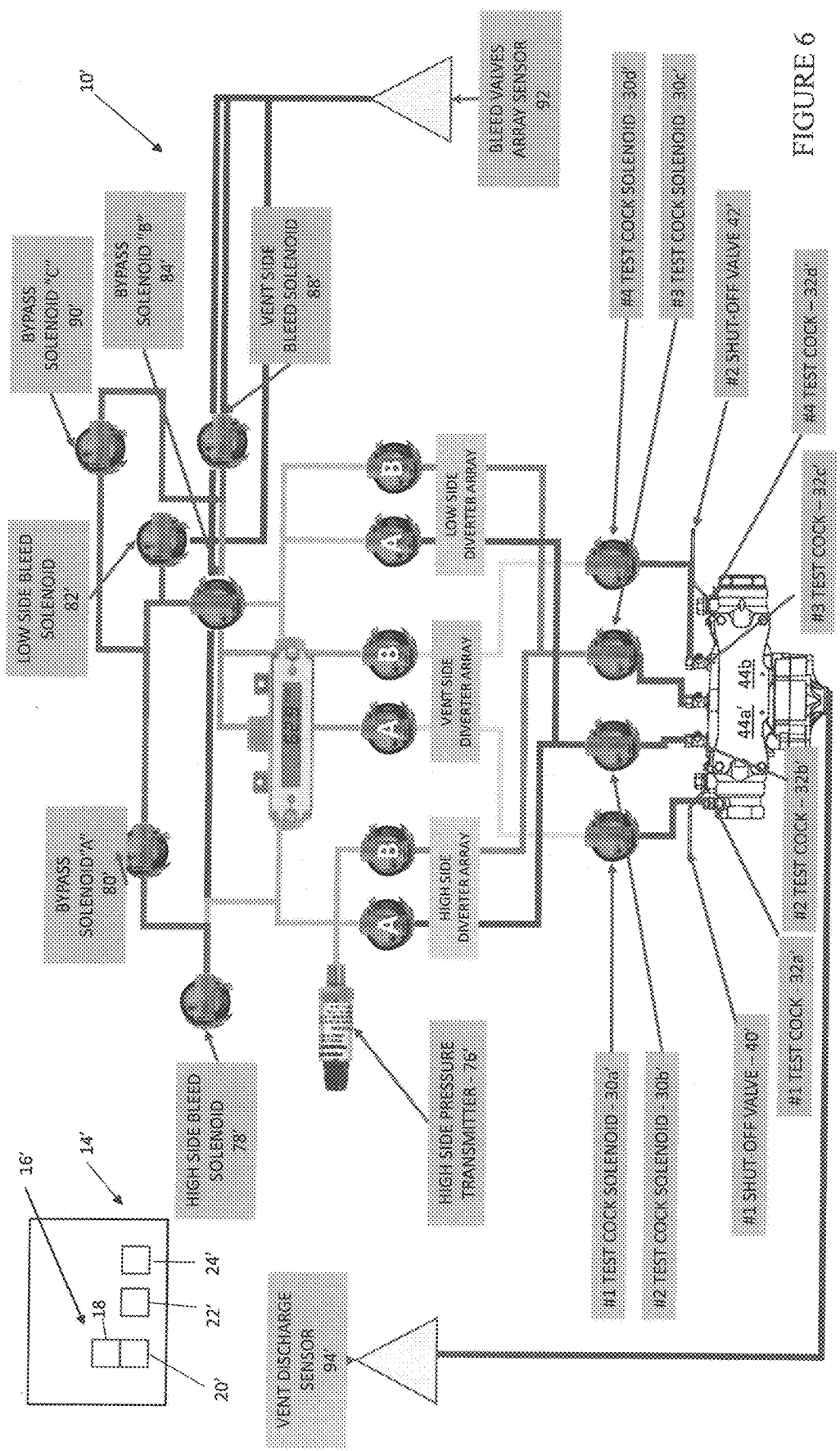
FIG. 6 is a diagram of a testing device for a backflow preventer, in accordance with one or more embodiments of the present invention.

Referring to FIG. 6, another embodiment of the testing device 10' may be seen. The testing device 10' is coupled to a backflow preventer assembly ID. The backflow preventer assembly 12' may have a plurality of test valves 32'. In the embodiment shown, backflow preventer assembly 12' may have four test valves 32*a*', 32*b*, 32*c*', and 32*d*'. The backflow preventer assembly 12' may have one or more shut-off valves. The shut-off valves may be used to stop water flow on either side of the backflow preventer assembly 12'. In the present embodiment, two shut-off valves 40' and 42' may be seen. The backflow preventer assembly 12' may have one ore more integrated check valves. The check valves may be used for backflow prevention. In the present embodiment, two check valves 44*a*' and 44*b*' may be seen. The backflow preventer assembly 12' may have a pressure release valve 38' which may be used to control and/or limit water pressure in the water system.

Each of the four test valves 32*a*', 32*b*', 32*c*', and 32*d*' may be connected to a corresponding automated valves 30*a*', 30*b*', 30*c*', and 30*d*'. The test valve 32*a*' may be connected to automated valve 30*a*' via a tube and/or hose. Similarly, test valve 32*b*' may be connected to automated valve 30*b*' via a tube and/or hose, test valve 32*c*' may be connected to automated valve 30*c*' via a tube and/or hose and test valve 32*d*' may be connected to automated valve 30*d*' via a tube and/or hose.

One or more of the automated valves 30' may be connected to a high side diverter 70' and to a low side diverter 72'. The high side diverter 70' and the low side diverter 72' may be valves used to divert water from the automated valves 30' to other destinations. In the present embodiment shown, the automated valve 30*b*' may be connected to a high side diverter 70*a*' and to a low side diverter 72*a*'. The automated valve 30*c*' may be connected to a high side diverter 70*b*' and to a low side diverter 72*b*'.

The high side diverters 70*a*' and 70*b*' may be coupled to a high side of a pressure differential transmitter 74' and to high side pressure transmitter 76'. The pressure differential transmitter 74' may be used to sense the difference in pressure between two ports (high side and low side) and may produce an output signal with reference to a calibrated pressure range. The high side pressure transmitter 76' may be used to measure and transmit the pressure on the high side. The high side of the pressure differential transmitter 74' may connect to a high side bleed solenoid 78' and a bypass solenoid 80'.

The low side dinners 72*a*' and 72*b*' may be coupled to a low side of the pressure differential transmitter 74'. The low side of the pressure differential transmitter 74' may connect to a low side bleed solenoid 82' and a bypass solenoid 84'. The pressure differential transmitter 74' may be comprised of two separate pressure differential transmitters, a high side pressure differential transmitter and a low side pressure differential transmitter. This may be done if both the high side pressure differential transmitter and a low side pressure differential transmitter are of a same make and model and are calibrated together.

The automated valves 30a' may be coupled to a vent side diverter valve 86a'. The automated valves 30d' may be coupled to a vent side diverter valve 86b'. The vent side diverter valves 86a' and 86b' may be coupled to the vent side bleed solenoid 88'. Bypass solenoids 80' and 84' may be coupled to bypass solenoid 90' which may be coupled to the vent side bleed solenoid 88'. The high side bleed solenoid 78', the low side bleed solenoid 82' and the vent side bleed solenoid 88' may be coupled to bleed valves array sensor 92'. The bleed valves array sensor 92' may be acoustic, flow, resistance or the like in design. A vent discharge sensor 94' may be coupled to a backflow preventer assembly 12'. The vent discharge sensor 94' may be ultrasonic, resistance, luminosity or the like in design.

The testing device 10' may have a controller assembly 14'. The controller assembly 14'. The controller 14' may be used to control the operation of one or more of the components of the testing device 10'. In general, all of the values and/or solenoids may be coupled to the controller assembly 14'. Thus, the automated valves 30a', 30b', 30c', and 31d'; the high side diverters 70a' and 70b'; the low side diverters 72a' and 72b'; the high side bleed solenoid 78'; the bypass solenoid 80'; the low side bleed solenoid 82'; the bypass solenoid 84'; the vent side diverter valve 86a'; the vent side diverter valve 86b; the vent side bleed solenoid 88'; and the bypass solenoid 90' may be coupled to the controller 14'. The bleed valves array sensor 92', vent discharge sensor 94', the pressure differential transmitter 74' and the high side pressure transmitter 76' may also be coupled to the controller 14'. The valves and/or solenoids may be coupled to the controller assembly 14' through wired, wireless connections or a combination thereof.

The controller 14' may comprise a microcontroller 16', a power supply, and a radio 24'. The microcontroller 16' may be a system on a chip (SOC), which is an integrated circuit that integrates all components of the testing device 10'. The microcontroller 16' may also have a memory 18' for storing programming instructions and information/data regarding the testing device 10' (e.g. location, model, owner, test results, etc.). The microcontroller 16' may have a processor 20' which may be used to control the various functions of the testing device 10' and used to execute the programming instructions. The microcontroller 16' may communicate with all of the peripherals of the testing device 10' through relays, or other circuits. Peripherals are the portions of the device 10' that are external to the controller assembly 14'. The microcontroller 16' may be capable of running autonomously by performing tests on a predefined interval and may also be capable of performing tests according to instructions sent to the microcontroller 16' from a remote location. The microcontroller 16' may have an initial base set of programming instructions when initially installed onto a backflow preventer 12', and the microcontroller 16' may receive software updates or changes in programming instructions wirelessly from a remote location. The controller assembly 14' may also have various input and output ports for connections for peripherals. Weatherproof connectors may be used to connect the peripherals to the input and output ports of the microcontroller 16'.

The radio 24' of the controller assembly 14' may use LORA® radio technology and may be capable of broadcasting on licensed or unlicensed spectrum frequency bands. The controller assembly 14' may be mounted in a weatherproof/waterproof enclosure with watertight connections for the peripherals. A USB cable, which is connected to the microcontroller 16', may also be included in the enclosure. The USB connection can be used for interfacing with the testing device 10' during installation or maintenance.

In operation, a test on the check valve 44b' may be performed first in order to check for tightness against reverse flow. To perform this test, the testing device 10' may open the high side bleed solenoid 78', the low side bleed solenoid 82' and the vent side bleed solenoid 88'. The pressure differential transmitter 74' is read until the pressure differential transmitter 74' reads zero "0". Readings are made on the high side pressure transmitter 76' until the high side pressure transmitter 76' reads zero "0". The bleed valves array sensor 92' is read until the bleed valves array sensor 92' reads zero "0". If no errors are recorded on the bleed valves array sensor 92' and the vent discharge sensor 94', the testing may continue. Errors may be defined as readings on the aforementioned sensors that are above predetermined threshold levels. If errors are recorded, the levels may be recorded and testing may be stopped.

If no errors are recorded on the bleed valves array sensor 92' and the vent discharge sensor 94', the high side diverter 70a' is opened and the high side diverter 70b' is closed. The low side diverter 72a' is then closed and the low side diverter 70b' is opened. The vent side diverter valves 86a' is then opened and the vent side diverter valve 86b' is closed. The shut-off valve 42' of the backflow preventer assembly 12' may be closed and the test valves 32b' and 32c' may be opened. The air in system is bleed out through the high side bleed solenoid 78' and the low side bleed solenoid 82 'until the bleed valves array sensor 92' senses that all the air is expelled. Once all the air is expelled, the high side bleed solenoid 78' and the low side bleed solenoid 82' may be closed.

The bypass solenoids 80' and 90' may then be opened. The bypass solenoids 80' and 90' may remain open until the bleed valves array sensor 92' senses that all the air is expelled. The bypass solenoids 80' may then be closed and the bypass solenoid 84' may be opened. The bypass solenoid 84' may remain open until the bleed valves array sensor 92' senses that all the air is expelled. The bypass solenoids 84' and 90' may then be closed and bypass solenoids 80' and 90' may be opened. The test valve 32d' may then be opened. One may wait until the bleed valves array sensor 92' senses that all the air is expelled.

The vent side bleed solenoid 88' may then be closed. The pressure differential transmitter 74' may then be read. The pressure differential transmitter 74' may continue to be monitored until the pressure stabilizes. The time it takes for the pressure to stabilize may then be recorded. If the pressure does not stabilize within a predetermined time frame ("X" seconds), the test may be labeled as "FAILED". If the pressure does stabilize within a predetermined time frame ("X" seconds), the test may be labeled as "PASSED". If the pressure does stabilize, the system 10' may record the time it took to stabilize, the pressure differential and the high side pressure. The test valve 32d may now be closed.

A second test may be performed once the aforementioned test has been passed. The second test may be performed to test the check valve 44a' for tightness and to record the pressure drop across the check valve 44a'. The static pressure drop across the check valve 44a' should be greater than the pressure relief valve 38' opening point (test 3 as discussed below) and at least 5.0 (Pounds per square inch differential) PSID.

To perform the second test, the bypass solenoid 80' may be closed. The test valve 32d' may then be closed. The vent side bleed solenoid 88' may then be opened. The bypass solenoid 84' and the bypass solenoid 90' may then be opened. The bypass solenoid 84' and 90' may remain opened until the bleed valves array sensor 92' senses that all the air is expelled. Once all the air is expelled, the bypass solenoid 84' may be closed. The system is now in a normal static state. The reading on the pressure differential transmitter 74' may be recorded as the check valve 44a' PSID.

A third test that may be performed may be to test operation of the pressure relief valve 38'. The pressure relief valve 38' should operate to maintain the "ZONE" between the two check valves 44a' and 44b' at least 2 PSID less than the supply pressure.

To perform test #3, a current status of the vent discharge sensor 94' may be recorded. A current state of the pressure differential transmitter 74' may then be recorded. The bypass solenoid 90' may be closed and the bypass solenoid 80' may be opened. The bypass solenoid 84' may be opened until the reading on the pressure differential transmitter 74' begins to drop. The state of the pressure differential transmitter 74' may be recorded once the vent discharge sensor 94' detects a change in moisture. The reading on the pressure differential transmitter 74' may then be recorded as the "Opening Differential Pressure of the Relief Valve". The shutoff valve 42' may then be closed. The vent side bleed solenoid 88' may be opened for a predetermined timeframe "X" seconds and then closed. The high side pressure may be read on the pressure differential transmitter 74'. The pressure reading should be zero "0". If not, a "FAULT" should be recorded for the shut-off valve 42' and the test should not proceed. If the pressure reading is zero "0", the automated valves 30a', 30b', 30c', and 30d' may be closed; and the high side diverters 70a' and 70b', the low side diverters 72a' and 72b', the high side bleed solenoid 78', the bypass solenoid 80', the low side bleed solenoid 82', the bypass solenoid 84', the vent side diverter valve 86a', the vent side diverter valve 86b', the vent side bleed solenoid 88', and the bypass solenoid 90' may be opened and vented to the atmosphere for a predetermined timeframe ("X" minutes) in order to bleed the testing device 10. The aforementioned solenoids/diverters of the testing device 10 may then be closed and the test may be completed.

The foregoing description is illustrative of particular embodiments of the invention, but is not meant to be a limitation upon the practice thereof. The following claims, including all equivalents thereof, are intended to define the scope of the invention.

What is claimed is:

1. A testing device for a backflow preventer assembly comprising:
    a plurality of automated valves, wherein each automated valve is coupled to a corresponding test valve of the backflow preventer assembly;
    a high side diverter array coupled to at least one of the plurality of automated valves;
    a low side diverter array coupled to at least one of the plurality of automated valves;
    a vent side diverter array coupled to at least one of the plurality of automated valves;
    a pressure differential transmitter coupled to the high side diverter array and the low side diverter array;
    a high side bleed solenoid coupled to a high side of the pressure differential transmitter;
    a low side bleed solenoid coupled to a low side of the pressure differential transmitter;
    a vent side bleed solenoid coupled to a vent side diverter array;
    a plurality of bypass solenoids coupled to the high side bleed solenoid, the low side bleed solenoid and the vent side bleed solenoid; and
    a first sensor coupled to the high side bleed solenoid, the low side bleed solenoid and the vent side bleed solenoid.

2. The testing device for a backflow preventer assembly in accordance With claim 1, comprising a second sensor coupled to the backflow preventer assembly.

3. The testing device for a backflow preventer assembly in accordance with claim 1, comprising a high side pressure transmitter coupled to the high side of the pressure differential transmitter.

4. The testing device for a backflow preventer assembly in accordance with claim 1, comprising a controller controlling operation of the testing device.

5. The testing device for a backflow preventer assembly in accordance with claim 1, wherein the plurality of automated valves comprises:
    a first automated valve coupled to a first test valve of the backflow preventer assembly;
    a second automated valve coupled to a second test valve of the backflow preventer assembly;
    a third automated valve coupled to a third test valve of the backflow preventer assembly; and
    a fourth automated valve coupled to a fourth test valve of the backflow prevent assembly.

6. The testing device for a backflow preventer assembly in accordance with claim 1, wherein the high side diverter array comprises a pair of high side diverter valves.

7. The testing device for a backflow preventer assembly in accordance with claim 5, wherein the high side diverter array comprises:
    a first high side diverter coupled to the second automated valve; and
    a second high side diverter coupled to the third automated valve.

8. The testing device for a backflow preventer assembly in accordance with claim 5, wherein the low side diverter array comprises:
    a first low side diverter coupled to the second automated valve; and
    a second low side diverter coupled to the third automated valve.

9. The testing device for a backflow preventer assembly in accordance with claim 5, wherein the vent side diverter array comprises:
    a first vent side diverter coupled to the first automated valve; and
    a second vent side diverter coupled to the fourth automated valve.

10. The testing device for a backflow preventer assembly in accordance with claim 1, wherein the plurality of bypass solenoids comprises:
    a first bypass solenoid coupled to the high side of the pressure differential transmitter;
    a second bypass solenoid the low side of the pressure differential transmitter; and
    a third bypass solenoid coupled to the first bypass solenoid, the second bypass solenoid and the vent side bleed solenoid.

11. A testing device for a backflow preventer assembly comprising:
    a plurality of automated valves, wherein each automated valve is coupled to a corresponding test valve of the backflow preventer assembly;
    a high side diverter array coupled to at least one of the plurality of automated valves;
    a low side diverter array coupled to at least one of the plurality of automated valves;

a vent side diverter array coupled to at least one of the plurality of automated valves;
a pressure differential transmitter coupled to the high side diverter array and the low side diverter array;
a high side bleed solenoid coupled to a high side of the pressure differential transmitter;
a low side bleed solenoid coupled to a low side of the pressure differential transmitter;
a vent side bleed solenoid coupled to a vent side diverter array;
a plurality of bypass solenoids coupled to the high side bleed solenoid, the low side bleed solenoid and the vent side bleed solenoid;
a first sensor coupled to the high side bleed solenoid, the low side bleed solenoid and the vent side bleed solenoid;
a second sensor coupled to the backflow preventer assembly; and
a controller controlling operation of the testing device.

12. The testing device for a backflow preventer assembly in accordance with claim 11, comprising a high side pressure transmitter coupled to the high side of the pressure differential transmitter.

13. The testing device for a backflow preventer assembly in accordance with claim 11, wherein the plurality of automated valves comprises:
a first automated valve coupled to a first test valve of the backflow preventer assembly;
a second automated valve coupled to a second test valve of the backflow preventer assembly;
a third automated valve coupled to a third test valve of the backflow preventer assembly; and
a fourth automated valve coupled to a fourth test valve of the backflow preventer assembly.

14. The testing device for a backflow preventer assembly in accordance with claim 13, wherein the high side diverter array comprises:
a first high side diverter coupled to the second automated valve; and
a second high side diverter coupled to the third automated valve.

15. The testing device for a backflow preventer assembly in accordance with claim 13, wherein the low side diverter array comprises:
a first low side diverter coupled to the second automated valve; and
a second low side diverter coupled to the third automated valve.

16. The testing device for a backflow preventer assembly in accordance with claim 13, wherein the vent side diverter array comprises:
a first vent side diverter coupled to the first automated valve; and
a second vent side diverter coupled to the fourth automated valve.

17. The testing device for a backflow preventer assembly in accordance with claim 11, wherein the plurality of bypass solenoids comprises:
a first bypass solenoid coupled to the high side of the pressure differential transmitter;
a second bypass solenoid the low side of the pressure differential transmitter; and
a third bypass solenoid coupled to the first bypass solenoid, the second bypass solenoid and the vent side bleed solenoid.

18. A testing device for a backflow preventer assembly comprising:
a first automated valve coupled to a first test valve of the backflow preventer assembly;
a second automated valve coupled to a second test valve of the backflow preventer assembly;
a third automated valve coupled to a third test valve of the backflow preventer assembly;
a fourth automated valve coupled to a fourth test valve of the backflow preventer assembly;
a first high side diverter coupled to the second automated valve;
a second high side diverter coupled to the third automated valve;
a first low side diverter coupled to the second automated valve;
a second low side diverter coupled to the third automated valve,
a first vent side diverter coupled to the first automated valve;
a second vent side diverter coupled to the fourth automated valve
a pressure differential transmitter coupled to the first and second high side diverters and the first and second low side diverters;
a high side pressure transmitter coupled to a high side of the pressure differential transmitter;
a high side bleed solenoid coupled to the high side of the pressure differential transmitter;
a low side bleed solenoid coupled to a low side of the pressure differential transmitter;
a vent side bleed solenoid coupled to a vent side diverter array;
a first bypass solenoid coupled to the high side of the pressure differential transmitter;
a second bypass solenoid coupled to the low side of the pressure differential transmitter;
a third bypass solenoid coupled to the first bypass solenoid, the second bypass solenoid and the vent side bleed solenoid;
a first sensor coupled to the high side bleed solenoid, the low side bleed solenoid and the vent side bleed solenoid;
a second sensor coupled to the backflow preventer assembly; and
a controller controlling operation of the testing device, the controller comprising:
a processor; and
a memory coupled to the processor, the memory storing program instructions that when executed by the processor, causes the processor to:
open the high side bleed solenoid, the low side bleed solenoid and the vent side bleed solenoid;
monitor the pressure differential transmitter, the high side pressure transmitter and the bleed valves array sensor until all reads zero "0";
report if the bleed valves array sensor does not read zero "0";
open the first high side diverter and close the second high side diverter if bleed valves array sensor reads zero "0";
close the first low side diverter and open the second low side diverter;
open the first vent side diverter valve and close the second vent side diverter valve;
close a second shut-off valve of the backflow preventer;
open the second test valve and the third test valve;
bled air out through the high side bleed solenoid and the low side bleed solenoid until the bleed valves array sensor senses that the air is expelled;

close the high side bleed solenoid and the low side bleed solenoid;
open the first bypass solenoid and the third bypass solenoid until the bleed valves array sensor senses that all the air is expelled;
close the first bypass solenoid and open the second bypass solenoid until the bleed valves array sensor senses that the air is expelled;
close the second bypass solenoid and the third bypass solenoid;
open the first bypass solenoid and the third bypass solenoid;
open the fourth test valve;
monitor the bleed valves array sensor until the air is expelled;
close the vent side bleed solenoid;
monitor the pressure differential transmitter until the pressure stabilizes;
mark as "FAILED" if the pressure does not stabilize within a predetermined time frame;
mark as "PASSED" if the pressure stabilizes within the predetermined time frame; and
close the fourth test valve.

19. The testing device for a backflow preventer assembly in accordance with claim 18, wherein the memory storing program instructions executed by the processor, causes the processor to:
test a first valve of the backflow preventer for tightness and to record a pressure drop across the first valve by closing the bypass solenoid, wherein the test of the first valve comprises:
closing the fourth test valve;
opening the vent side bleed solenoid;
opening the second bypass solenoid and the third bypass solenoid until the bleed valves array sensor senses that air is expelled; and
close the second bypass solenoid.

20. The testing device for a backflow preventer assembly in accordance with claim 18, wherein the memory storing program instructions executed by the processor, causes the processor to:
test operation of a relief valve of the backflow preventer, wherein the test of operation of the relief valve comprises:
dose the third bypass solenoid;
open the first bypass solenoid;
open the second bypass solenoid until a reading on the pressure differential transmitter begins to drop;
record a state of the pressure differential transmitter when the vent discharge sensor detects a change in moisture;
record a reading on the pressure differential transmitter as a "Opening Differential Pressure of the Relief Valve";
close the second shutoff valve;
open the vent side bleed solenoid for a predetermined timeframe and then closed; and
read a high side pressure on the pressure differential transmitter.

* * * * *